United States Patent
Schmidt

(10) Patent No.: US 7,570,703 B2
(45) Date of Patent: Aug. 4, 2009

(54) METHOD FOR TRANSMITTING A DIGITIZED MESSAGE OF LITTLE INFORMATION DEPTH

(75) Inventor: Frank Schmidt, Zorneding (DE)

(73) Assignee: EnOcean GmbH, Oberhaching (DE)

( * ) Notice: Subject to any disclaimer, the term of this patent is extended or adjusted under 35 U.S.C. 154(b) by 508 days.

(21) Appl. No.: 11/145,762

(22) Filed: Jun. 6, 2005

(65) Prior Publication Data
US 2006/0018376 A1    Jan. 26, 2006

Related U.S. Application Data

(63) Continuation of application No. PCT/EP03/03804, filed on Nov. 18, 2003.

(30) Foreign Application Priority Data
Dec. 5, 2002   (DE) ................ 102 56 939

(51) Int. Cl.
H04L 27/00    (2006.01)
(52) U.S. Cl. ..................................... 375/295
(58) Field of Classification Search ........... 375/295
See application file for complete search history.

(56) References Cited

U.S. PATENT DOCUMENTS

| | | | |
|---|---|---|---|
| 4,443,787 A * | 4/1984 | Denk et al. | 341/11 |
| 5,748,043 A * | 5/1998 | Koslov | 331/1 A |
| 6,124,806 A | 9/2000 | Hollcroft et al. | |
| 6,738,394 B1 | 5/2004 | Kreuzgruber et al. | |
| 7,161,985 B2 * | 1/2007 | Dostert et al. | 375/257 |

FOREIGN PATENT DOCUMENTS

| | | |
|---|---|---|
| DE | 23 51 013 | 4/1975 |
| DE | 42 35 187 A1 | 4/1994 |
| DE | 195 14 195 C1 | 10/1996 |
| DE | 196 19 311 A1 | 12/1996 |
| DE | 198 26 513 A1 | 12/1999 |
| DE | 100 38 923 | 3/2001 |
| DE | 199 47 344 A | 4/2001 |
| DE | 100 60 581 A1 | 6/2002 |

OTHER PUBLICATIONS

Rudolf Mäusl, "Digitale Modulationsverfahren", Dr. Alfred Hüthig Verlag Heidelberg, 2. Auflage, 1988, ISBN 3-7785-1581-0, pp. 242-245.
Examination Report date May 23, 2007 issued for the corresponding German Patent Application No. 102 565 939.8-35.

* cited by examiner

Primary Examiner—David C Payne
Assistant Examiner—Nader Bolourchi
(74) Attorney, Agent, or Firm—Cohen Pontani Lieberman & Pavane LLP

(57) ABSTRACT

A method for transmitting a digital message of little depth of information such as, e.g. measured values of sensors by transmitters, for example wireless sensors with little power reserves, in which the data are transmitted in pulses and each transmitted pulse transmits the data with a data transmission rate of more than 100 kbit per second. To further optimize the transmission method, the information content of an individual transmitted pulse is increased by time- or position-coding.

4 Claims, 2 Drawing Sheets

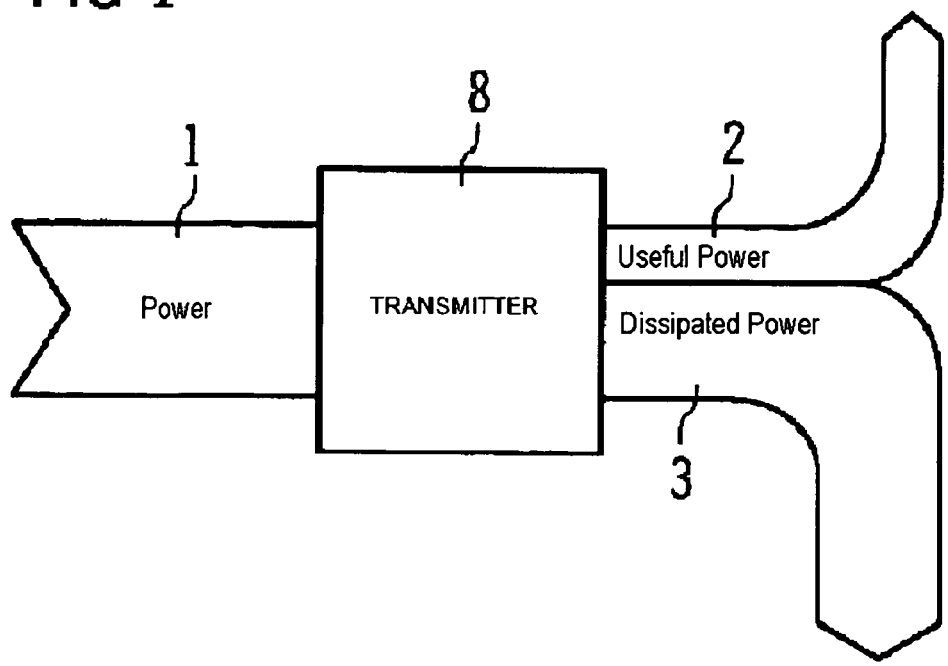
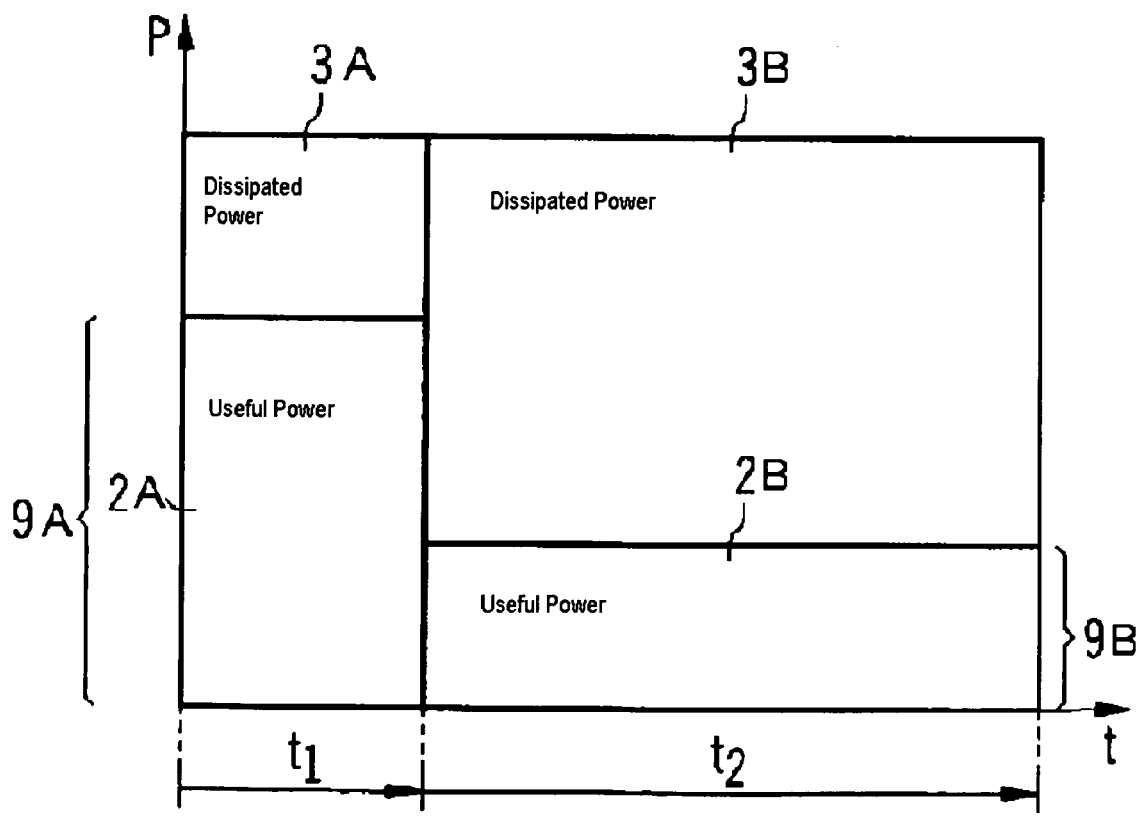

METHOD FOR TRANSMITTING A DIGITIZED MESSAGE OF LITTLE INFORMATION DEPTH

RELATED APPLICATIONS

This is a continuation of International Application No. PCT/EP2003/003804, filed on Nov. 18, 2003, which claims priority from German application no. 102 56 939.8 filed Dec. 5, 2002, the contents of which is hereby incorporated by reference.

FIELD OF THE INVENTION

The invention relates to a method for transmitting a digitized message of little depth of information such as, e.g. measured values of sensors by transmitters, for example wireless sensors with limited power reserves.

BACKGROUND OF THE INVENTION

It is necessary for transmitters used in certain applications to transmit signals, or messages, having a relatively small information content, referred to herein as little depth of information. For example, the transmission of a metered value could be a message of little information depth. Also, a transmission of a simple on/off signal combined with an identification number or code could have only a little depth of information. To fulfill their task, transmitters of the generic type such as, e.g. wireless sensors, must manage with a limited power reserve available to them. When such a transmitter is operated, the required power is divided into a portion of useful power which flows into the transmitted signal and a portion of dissipated power which, ultimately converted into e.g. heat energy which is not needed, is lost.

Printed document DE 19947344 A shows a sensor with transmitting and receiving unit for wireless data transmission with low power consumption, the low power consumption in the device according to printed document DE 19947344 A being given by the fact that in idle mode, when no signal is being transmitted, a sleep mode with low power consumption is engaged. The sleep mode is ended by means of a cyclically repeating modulated synchronization signal of a base station, which is received by the device, and the device transmits modulated data signals to the base station. After the transmission of the modulated data signals, the device drops back into the sleep mode. During this sleep mode, the power consumption of the device is low since the power-consuming transmitting operation of the device is limited to the period at which the base station is requesting data. Should the data transmission be faulty due to an interference signal and the data would otherwise be lost, the data signal is transmitted repetitively in a recurring mode. This occurs at identical time intervals until the device receives a modulated acknowledgement signal which is transmitted by the base station to the device after having successfully received the data. This means, on the one hand, the device is operating a bidirectional radio traffic with the base station and, on the other hand, the device is transmitting independently of the interference frequencies of adjacent interfering transmitters until the data are received error-free by the base station. The transmitting of the data signal is thus actually not power-optimized. Power optimization is only related to the period during which the sleep mode is active.

SUMMARY OF THE INVENTION

One object of the present invention is to improve use of the available power for transmitting a message.

This and other objects are attained in accordance with one aspect of the present invention directed to a method for transmitting a digitized message of little depth of information in a power-saving manner by transmitters with limited power reserves in an environment of periodic radio interferences sources. The message is transmitted in pulses and several times, and each transmitted pulse transmits the message with a data transmission rate which is at least of such a magnitude that the length of the transmitted pulse in time is shorter than the length in time between the periodic disturbances and wherein the period between two transmitted pulses differs from integral multiples of a period of the periodic radio interference sources.

A concept underlying the invention is to load the circuit arrangement needed for transmitting for as short a period as possible so that the proportion of time for producing dissipated power is as small as possible.

The method according to an embodiment of the invention avoids or circumvents the influence of interfering influences occurring periodically. Thus, for example, a possible interfering influence is the periodic signal of a power supply grid and an associated facility which, for example, oscillates at a frequency of 50 to 60 Hz and thus with a period of 16 to 20 milliseconds.

According to an embodiment of the invention, a particular transmission rate is selected, and by transmitting a small amount of information of a few bits and by selecting a corresponding bandwidth, the length in time of the transmitted pulse is short enough to fit trouble-free in the interval between the periodic disturbances. During such an interval it is possible to transmit a signal undisturbed. The signal is transmitted repeatedly so that if the first transmitted pulse is superposed by a pulse or signal of a periodic disturbance, the second transmitted signal will occur during the interval between the periodic disturbances.

In an embodiment of the invention, the transmission rate is selected to be >100 kbit per second, and a corresponding bandwidth of the transmitted signal is also selected for purposes of the invention.

Increasing the bandwidth reduces the range of the signal, the transmitted power remaining the same. The reduction in range is accepted for achieving the object. Due to the unfavorable efficiency of the circuit arrangements for generic transmitters, the power saving due to shortening the transmitted signal overall and thus shortening the period for producing dissipated power must be given a higher value than the loss of range.

As has been explained above, sending out the same information several times thus has the result that at least one of the transmitted messages arrives free of interference at the receiver. According to an embodiment of the invention, other interfering pulses of a periodic type are also taken into consideration when selecting the time interval between two transmitted pulses. These are, e.g., the periodic transmitted pulses caused by the frequency division multiplex method of a mobile radio telephone, with a time interval of approx. 125 µs. It is, therefore, advantageous to select the time intervals to be unequal to the 125 µs of a mobile radio network and unequal to the 16 to 20 ms of a power supply grid.

Within the range of the signal, an indeterminate number of transmitted signals or other pulses may also occur which interfere with the transmitted signal. To improve the reliability that the transmitted signal will also reach a receiver without interference and does not have superimposed upon it another interfering signal, the period between the transmitted pulses is selected in another advantageous embodiment to be such that it differs from integral multiples of interfering signal periods within a range of the signal pulses.

To achieve further power savings, the method according to an embodiment of the invention increases the information content of individual transmitted bits to have more value by using a coding of the bits that is not only two-valued e.g. high or low, but multi-valued. It is thus possible to increase the information content of a bit by, e.g. having the information carried not only by the voltage signal being high or low but, also, by the time of occurrence of the voltage signal. It is, thus, possible to transmit multiple information with the same power.

BRIEF DESCRIPTION OF THE DRAWINGS

FIG. 1 shows a diagrammatic representation of the energy flows,

FIG. 2 shows a power/time diagram,

DETAILED DESCRIPTION OF THE DRAWINGS

Figure 3:
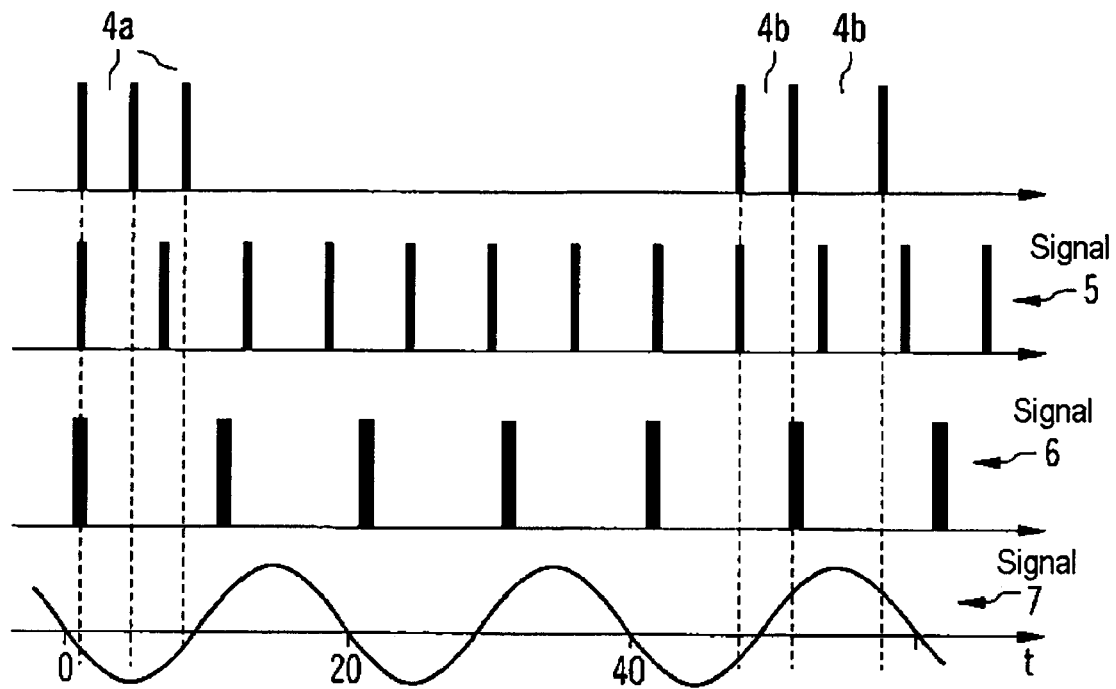
FIG. 3 shows the appearance of transmitted and interfering pulses in time.

FIG. 1 shows in a diagrammatic representation the energy flows during a transmitting process. First, the power 1 supplied to the transmitter 8 is divided into a useful power 2 and a dissipated power 3 during the transmitting process. The useful power is transferred into the transmitted signal and the dissipated power, as a rule, is unwanted and only leads to the heating up of the transmitter and the control electronics. In a preferred embodiment, the transmitter is powered by an indirect current generated in response to an electromagnetic field.

The power/time diagram of FIG. 2 shows the proportions of useful power 2A and 2B and dissipated power 3A and 3B at different bandwidths 9A and 9B and the resultant shorter or longer transmitting times $t_1$; $t_2$. Thus, in the case of a high bandwidth 9A and short transmitting time $t_1$ and identical total power P, the proportion of dissipated power 3A is distinctly less compared with the useful power 2A.

A power-saving concept which is also possible theoretically and which reduces the transmitting power and the transmitted bandwidth utilized does not lead to the same power saving. The reason for this is that the losses occurring in a circuit arrangement necessary for transmitting cannot be reduced to the same extent as the transmitting power and the bandwidth.

At a narrower bandwidth 9B of the signal, a greater transmitting time is required. This means that, with the same power consumption of the circuit, the proportion of dissipated energy 3B compared with the useful energy 2B is distinctly greater.

FIG. 2 thus shows that the proportion of dissipated power can be reduced by means of the increase in bandwidth and in the associated shortening in transmitting time, the power consumption of the circuit remaining the same. A resultant reduction in the range which may occur will be accepted.

Due to the distinct improvement in the ratio of dissipated power to useful power and thus the better power utilization, the method allows redundant or repeated transmitting events for increasing the reliability of transmission. According to the method, these transmitting events shown in a timing diagram in FIG. 3 are selected in such a manner that the time interval 4 between two transmitting events is either a fixed time interval or a randomly selected, variable time interval.

FIG. 3 shows four signals. The signal in the first line of FIG. 3 shows the pulses of the transmitted signal in accordance with the invention. This signal includes a small amount of information and has a fixed time interval 4a between the transmitted pulses as well as a random time interval 4b. The signal 5 in the second line of FIG. 3 represents a first periodically occurring interference or disturbance. The signal 6 in the third line of FIG. 3 represents a second periodically occurring interference or disturbance, and the signal 7 in the fourth line of FIG. 3 represents a third periodically occurring interference or disturbance.

As is evident from FIG. 3, it is possible for the first disturbance signal 5 to be superimposed on a first pulse of a signal transmitted in accordance with the invention, thus interfering with its reception. It is also possible for the second disturbance signal 6 to be superimposed on the next pulse of a signal transmitted in accordance with the invention at fixed interval 4a, thus also interfering with its reception. In such a situation, a signal transmitted at a fixed interval 4a would encounter continual interference from disturbance signals 5 and 6. However, use of a random time interval 4b avoids superposition of the second disturbance signal 6 on the next pulse transmitted in accordance with the invention. The decisive factor is the selection of the time interval between the two transmitting events, or pulses. It is reasonable and advantageous to select the interval between the two transmitting events in such a manner that it differs from the period of known interference signals, as shown on the right side of FIG. 3. These could be, e.g. a mobile radio telephone with a period of 125 µs for the time division multiplex method or the alternating grid voltage with 50 to 60 Hz or also other repeatedly occurring interference frequencies. It is thus reasonable, e.g. to make the period between the two transmitting pulses unequal to 16 to 20 ms and/or also unequal to 125 µs.

A randomly selected time interval 4 also entails the advantage that the case where two interfering pulses are located at exactly the predetermined time interval 4 and thus interfere with a first and a second transmitting event is reduced by the random selection of the time interval between two transmitting pulses. This is shown at the right-hand end of the time axis t in FIG. 3.

Figure 4:
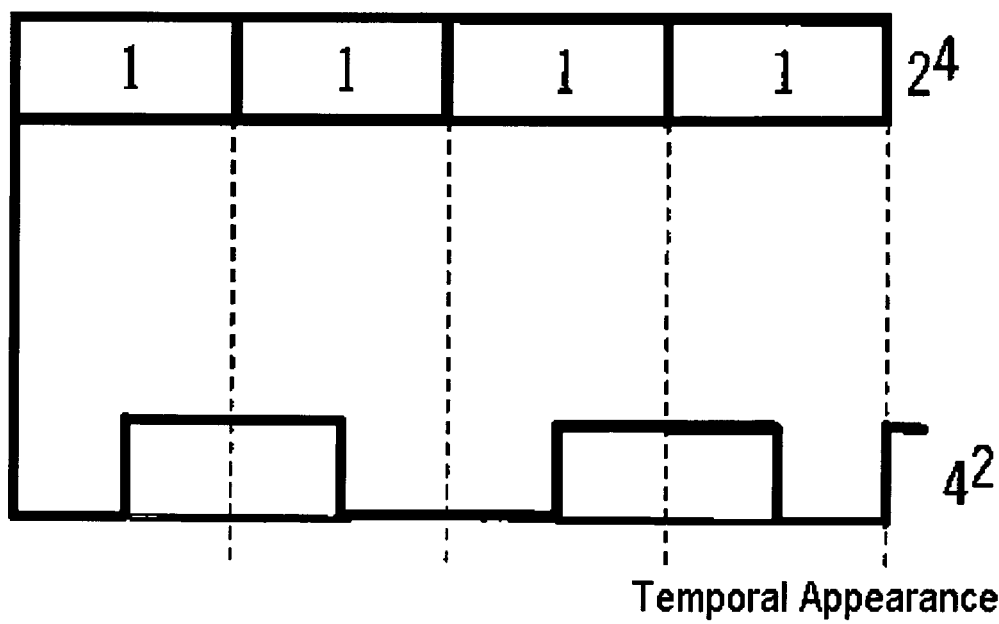
FIG. 4 shows a transmitting protocol having information content greater than just high/low.

To further improve the energy balance per transmitted bit, a coding of each individual bit so as to have more information content is indicated on the time axis t in FIG. 4. A time of occurrence, or position, coding as reproduced here allows the information content of an individual transmitted bit to be multiplied. The signal sequence shown in FIG. 4 shows, on the one hand, a signal sequence 1111 (high high high high) over a period of four pulses. This bit sequence thus represents an information content of $2^4$.

If the information of an individual transmitted pulse is not present in the usual manner of 1 or 0 but in its temporal appearance, $4^2$ information items can be transmitted in the same time but with half the power requirement. The useful power necessary for transmission can be interpreted as the area under the pulses.

The example shown in FIG. 4 shows two time-coded transmission pulses. In this arrangement, these pulses carry the information in their position and/or in their appearance in time. More specifically, if there is a four clock cycle as shown in FIG. 4, every clock can carry the information of one bit (a 0 or 1). It is possible to increase the content, or value, of the information that can be transmitted during one clock if the time of occurrence of each bit is additionally used to transmit information. Of course, it is understood that the transmitter and receiver have to be suitably synchronized.

This information is thus higher-valued with less power requirement than would be achievable in the same time of four clock cycles in the usual manner in the form of two-valued clocked high-low signals.

FIG. 4 shows that it is possible during one clock to transmit two message pulses if the transmitter and receiver are suitably synchronized. It should be readily understood that more than two pulses, for example ten pulses, can be used during a clock if the transmitter and receiver are properly synchronized. It is thus shown in FIG. 4 that a higher information content can be transmitted with a fraction of useful power.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

I claim:

1. A method for radio transmitting a digitized message of little depth of information in a power-saving manner by transmitters with limited power reserves in an environment of periodic radio interference sources generating periodic disturbances, wherein the method comprises the steps of:
   transmitting the digitized message of little depth of information in each of a transmitting pulse;
   for each said transmitting pulse, transmitting the digitized message of little depth of information with a data transmission rate which is at least of such a magnitude that a length of the transmitting pulse in time is shorter than a length in time between the periodic disturbances; and
   wherein a message of a same content is transmitted at least a second time, a period of time between the transmitting pulses of the message of the same content being one of predetermined and randomly selected; and
   wherein the period of time between the transmitting pulses of the message of the same content differs from integral multiples of interference signal periods of the periodic disturbances, within a range of the signal pulses.

2. The method of claim 1, wherein the transmitting pulses are not synchronized with the periodic disturbances.

3. The method of claim 1, wherein the transmitter with limited power is provided with energy via an electromagnetic field.

4. The method of claim 1, wherein the transmitter with limited power is powered via an induced current generated in response to an electromagnetic field.

* * * * *

UNITED STATES PATENT AND TRADEMARK OFFICE
CERTIFICATE OF CORRECTION

PATENT NO. : 7,570,703 B2  
APPLICATION NO. : 11/145762  
DATED : August 4, 2009  
INVENTOR(S) : Frank Schmidt Page 1 of 1

It is certified that error appears in the above-identified patent and that said Letters Patent is hereby corrected as shown below:

On the Title Page is changed as follows:

Item --(63) Continuation of application No. ~~PCT/EP03/03804~~ PCT/DE03/03804, filed on Nov. 18, 2003.--

Col. 1 lines 8-12 is changed as follows:

--This is a continuation of International Application No. ~~PCT/EP2003/003804~~ PCT/DE2003/003804, filed on November 18, 2003, which claims priority from German application no. 102 56 939.8 filed December 5, 2002, the contents of which is hereby incorporated by reference.--

Signed and Sealed this

Twenty-ninth Day of September, 2009

David J. Kappos  
*Director of the United States Patent and Trademark Office*